UNITED STATES PATENT OFFICE.

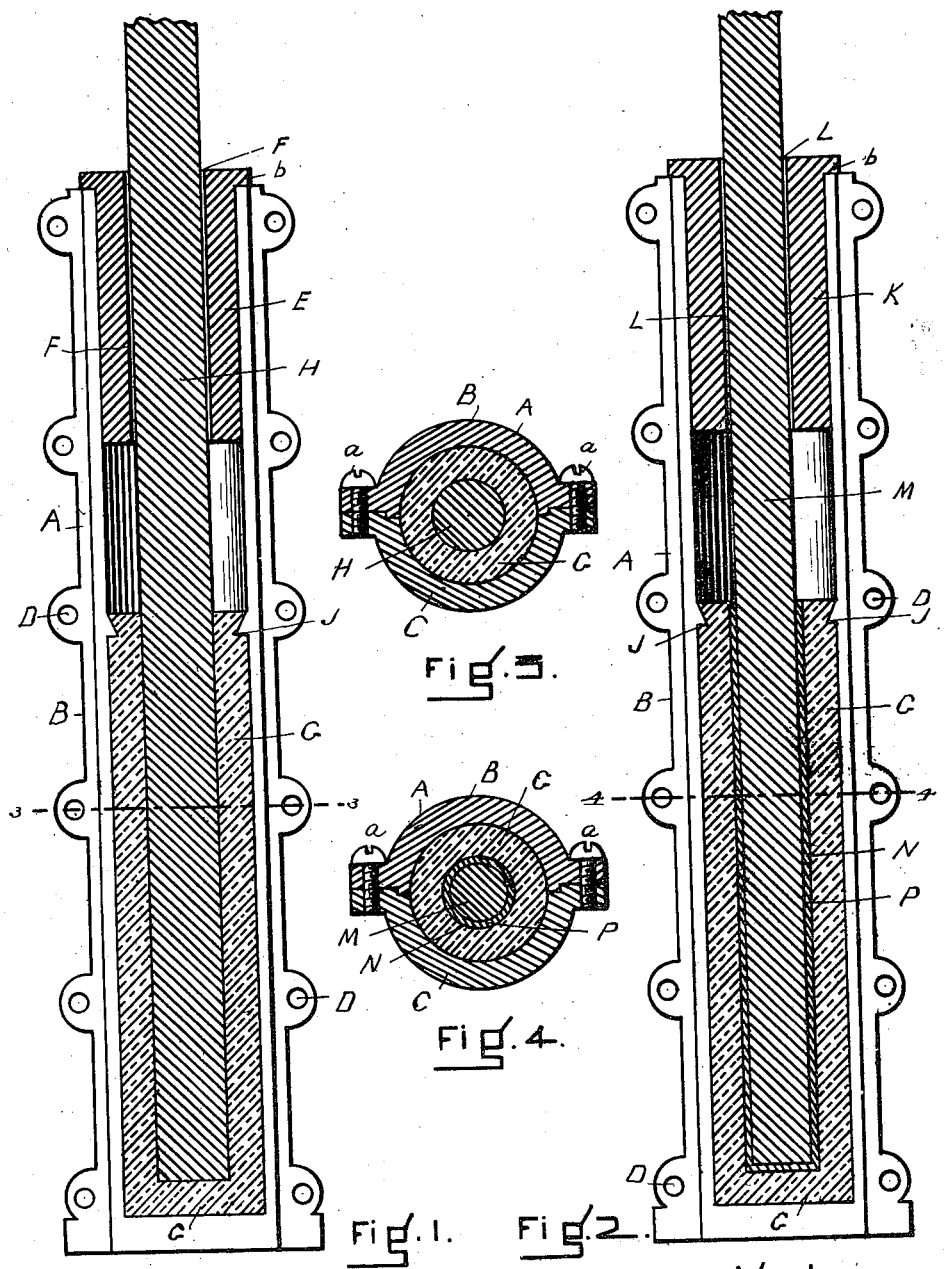

JOHN L. P. SPOONER, OF PROVIDENCE, RHODE ISLAND.

MOLD FOR MAKING COMPOUND METAL INGOTS.

SPECIFICATION forming part of Letters Patent No. 418,767, dated January 7, 1890

Application filed May 25, 1889. Serial No. 312,034. (No model.)

*To all whom it may concern:*

Be it known that I, JOHN L. P. SPOONER, of Providence, in the county of Providence and State of Rhode Island, have invented certain new and useful Improvements in Molds for Making Solid or Hollow Compound Metal Ingots, of which the following is a full, clear, and exact description.

In the manufacture of compound seamless-plated ingots it has been the custom to turn to a uniform diameter a core or rod of base metal and place the said core or rod in a seamless cylindrical tube or thimble of fine metal whose inside diameter and shape correspond to the outside diameter and shape of the base-metal core or rod, the two surfaces then being united by means of soldering, the solder being applied by any of the usual ways. These ingots are eventually reduced by rolls, then afterward drawn into wire for the manufacture of jewelry. One objection to this process is that it is nearly or quite impossible to have the solder fuse and run down around the core or filling, so as to unite the surface of the core or rod to that of the finer metal evenly, thereby causing imperfect stock, and consequently a great waste. Another objection to the soldering process is that when the solder is in the act of running down and around the above core or rod it will very often skip or jump in spots, thereby causing blisters, which elongate or draw out as the ingot is in process of reduction. Wherever the blister comes is waste stock. Another objection is its great cost in time and labor. The core or rod has to be first turned to a uniform diameter to that of the aperture in the fine-metal tube or thimble.

The tube or thimble is made of alloy, then melted and poured into a cylindrical mold, in some instances. In others the alloy is poured in a molten mass into a flat ingot-mold such as is commonly used by jewelers. It is then reduced to the proper thickness by passing through rolls or mills under many different strains or pressures, being annealed or heated to a bright-red heat many times during the process of reduction, and after being reduced to the required thickness it is then struck up or forced into dies until it is of the required shape. It is also heated or annealed many times during this forming process, all of which requires time and labor. The tube or thimble of fine metal now formed as above mentioned is ready to be united or soldered to the base-metal core or rod. The solder is then alloyed, melted, and reduced by burring or grinding into small particles, or what is termed "filed solder," by a machine. The outside of the core or rod and the inside of the tube or thimble receive a coating of borax previously ground in water. The core or rod is now inserted into the tube or thimble of fine metal and the solder applied in some one of the many ways known. Then the core, thimble, and solder are placed in the fire and allowed to remain until it is thought the solder has adhered to the two surfaces, when they are removed. All of these different operations consume a vast amount of time and labor, to say nothing of the imperfect stock when drawn into wire, which is a dead loss. The time and labor consumed in these different processes, together with the waste, enhance the cost of production so much that it is not practical.

This invention relates to a mold for the manufacture of seamless-plated wires, so that time and labor are saved and the cost reduced to a minimum; and this invention consists of a mold for the making of solid or hollow compound metal ingots, all substantially as hereinafter fully described, reference being had to the accompanying sheet of drawings, in which is illustrated a mold constructed in accordance with this invention.

Figures 1 and 2 represent in central vertical section a mold, but showing different forms to be hereinafter referred to. Figs. 3 and 4 are cross-sections on lines 3 3 and 4 4, respectively, of Figs. 1 and 2.

A in the drawings represents a shell or casing, of cast-iron or other metal, circular in cross-section, of any desired size, and made in two parts B and C, adapted to be secured together by screws $a$ through the screw-holes D, in the usual manner of making molds.

In the upper part of the shell A in Fig. 1 is a sleeve or thimble E, closely fitting the interior of the shell and having a central vertical passage F. In the lower part of this shell is a lining G of fire-resisting material, such as plumbago and clay.

In the preparation of the mold for use the fire-resisting material is first placed in the shell A, of the quantity desired, in a plastic or moist condition, and then the sleeve E, having a flange b, inserted in the shell and a rod or core H, Fig. 1, of iron or suitable material of even diameter throughout and closely fitting the passage F in the sleeve, is inserted therein and pressed and forced down into the plastic material nearly to the bottom of the shell, being guided in such movement by the thimble or sleeve, which disposes of the material G about and around the core and between it and the shell, making a lining to the shell, as shown in the figures. When the fire-resisting material G is set and dry, the core H is removed, and the mold making the crucible is then ready for use.

To prevent the material G from displacement when set, a flange J is arranged on the interior of the shell, with which it engages, as shown.

In the use of the mold the gage or thimble or sleeve (shown in Fig. 1) is first removed from the shell and another sleeve or thimble K (see Fig. 2) inserted therein, which is of the same external diameter to fit the shell, but has its central passage L of a less diameter than the sleeve or thimble E, (shown in Fig. 1,) so that if then the core or spindle M of Fig. 2, made to fit this passage L in thimble or sleeve K, is inserted and moved down into the mold it will leave an annular space or chamber N between it and the interior surface of the fire-resisting material, the difference between the two diameters of the two cores being the thickness of fine metal to be plated or united upon the core or rod of base metal.

The quality and quantity of the fine metal being determined and the alloy weighed, place it into the crucible or mold and put the shell or casing A into the fire, (a charcoal forge fire or some one of the many blast-furnaces,) and let it remain in the fire until the alloy has melted or reached a fluid state. Then put the core M, of base metal, Fig. 2, in the aperture L of the sleeve or gage M, and let it slide gently down, and by a gentle pressure immerse it into the molten or fluid alloy nearly to the bottom of the mold, which causes it to displace the molten alloy, which is slowly forced up the annular space or chamber until it reaches to the top of the fire-resisting material. The heat generated by the fire has caused the surface of the core base metal M and that of the fine alloy to adhere or fuse to each other as the alloy forces its way slowly upward. When the molten metal is up to the desired height, the fusion of the fine and base metal is complete and a firm and even coating of fine metal P covers the core or rod M of base metal, when the shell or casing with its contents is removed from the fire and allowed to cool. The seamless-plated compound ingot is then removed from the mold, the ingot being now ready to be reduced to wire of any size or shape.

The core can be either solid or hollow, as desired, and when hollow of any desired thickness; but in the use of a hollow core the lower end is closed with a plug of fire-resisting material, or any suitable material to prevent the fine metal from entering the same.

The fire-resisting material can be made of any suitable material other than clay and plumbago, although these ingredients are preferable, and when made of these proportions are about one-tenth part of the plumbago to that of the clay, and mixed with sufficient water to make it plastic.

Having thus described my invention, what I claim is—

1. In a mold for casting metal ingots, the combination, with a shell or casing of cast-iron or other metal, of a thimble or gage inserted therein, for the purpose specified.

2. In a mold for casting metal ingots, the combination, with a shell or casing of cast-iron or other metal, of a thickness or lining of a fire-resisting material, for the purpose specified.

3. In a mold for casting metal ingots, the combination, with a shell or casing of cast-iron or other metal, of a thickness or lining of a fire-resisting material consisting of clay and plumbago mixed together, for the purpose specified.

4. In a mold for casting metal ingots, the combination, with a shell or casing of cast-iron or other metal, and a thickness or lining of fire-resisting material, of a thimble or gage inserted therein, for the purpose specified.

In testimony whereof I have hereunto set my hand in the presence of two subscribing witnesses.

JOHN L. P. SPOONER.

Witnesses:
EDWIN W. BROWN,
CARRIE E. NICHOLS.